United States Patent [19]

Dru

[11] Patent Number: 5,348,128
[45] Date of Patent: Sep. 20, 1994

[54] APPARATUS FOR THE COLLECTION, IDENTIFICATION AND RECLAMATION OF RECYCLABLE WASTE

[76] Inventor: Francoise Dru, 16, rue Gambetta, 92320 Chatillon, France

[21] Appl. No.: 971,839

[22] PCT Filed: Aug. 20, 1990

[86] PCT No.: PCT/FR90/00616

§ 371 Date: Mar. 4, 1993

§ 102(e) Date: Mar. 4, 1993

[87] PCT Pub. No.: WO92/03360

PCT Pub. Date: Mar. 5, 1992

[51] Int. Cl.⁵ .................................................. G07F 7/06
[52] U.S. Cl. ...................................... 194/209; 194/213
[58] Field of Search ............... 194/205, 208, 209, 210, 194/212, 213; 209/930, 524

[56] References Cited

U.S. PATENT DOCUMENTS

| | | | |
|---|---|---|---|
| 3,446,351 | 5/1969 | Born | 209/583 X |
| 4,653,627 | 3/1987 | Hampson et al. | 194/209 |
| 4,784,251 | 11/1988 | DeWoolfson et al. | 194/209 |
| 4,919,534 | 4/1990 | Reed | 209/524 X |
| 5,100,005 | 3/1992 | Nobel et al. | 209/930 X |

FOREIGN PATENT DOCUMENTS

| | | | |
|---|---|---|---|
| 0006242 | 1/1980 | European Pat. Off. | |
| 0301978 | 2/1989 | European Pat. Off. | 194/209 |
| 8806095 | 9/1988 | Fed. Rep. of Germany. | |
| 2643617 | 8/1990 | France. | |
| 2224922 | 5/1990 | United Kingdom. | |

*Primary Examiner*—F. J. Bartuska
*Attorney, Agent, or Firm*—Richard C. Litman

[57] ABSTRACT

Waste collection units include an orifice (4a) for accepting the waste materials. The units are equipped with (a) the orifice (4a), transmitter (25), receiver (26) and color sensors (27 and 28) adapted to ascertain an approximate identification of the waste introduced into the orifice; (b) a conveyor (24) for transporting the waste beyond the orifice; and (c) a distributor (33) for issuing a waste deposit slip, and controlled by the orifice (4a), transmitter (25), receiver (26) and color sensors (27 and 28), in combination with the conveyer (24).

14 Claims, 4 Drawing Sheets

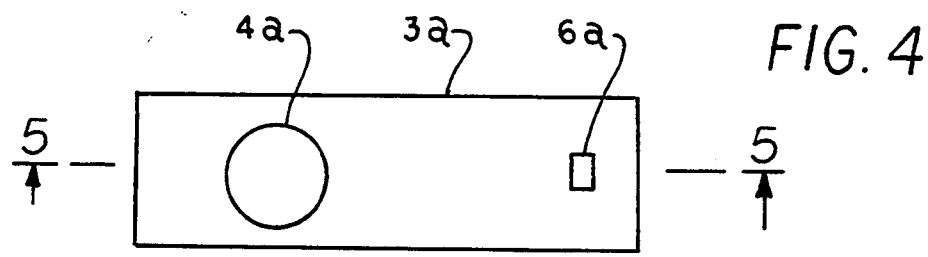
FIG. 4
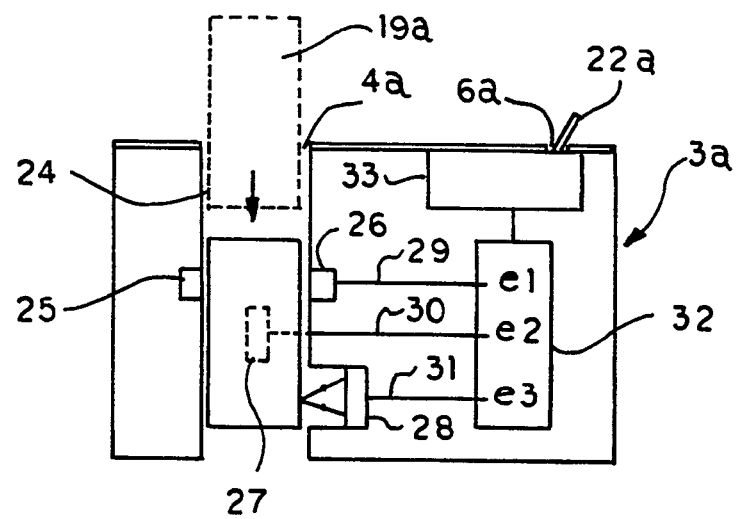
FIG. 5
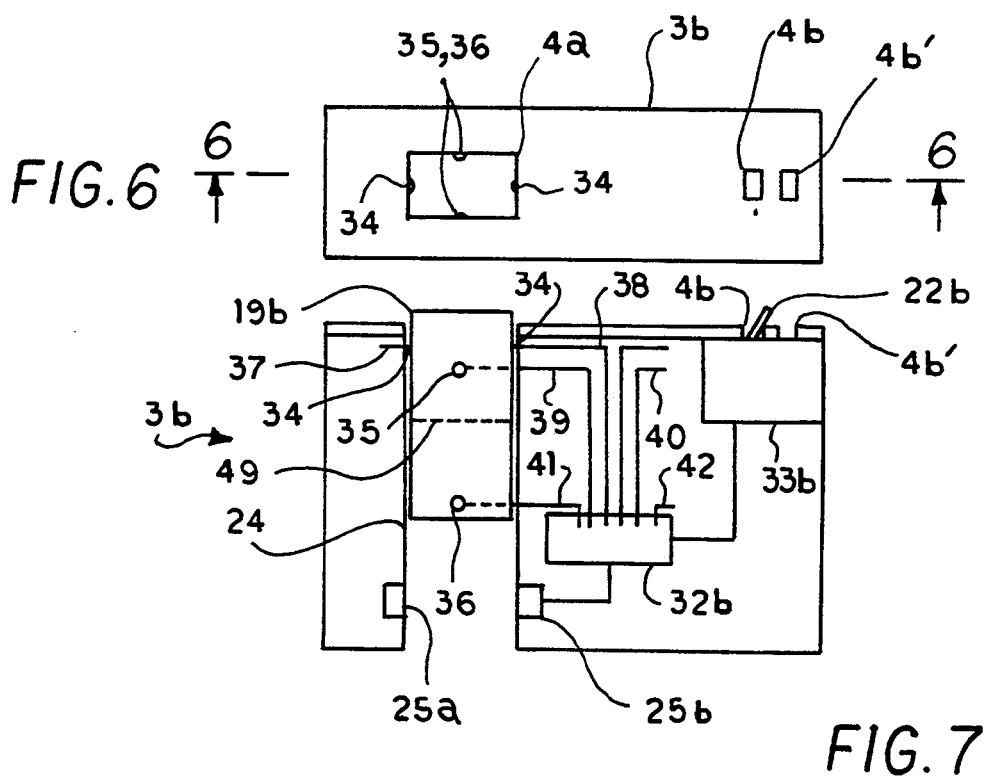
FIG. 6
FIG. 7

APPARATUS FOR THE COLLECTION, IDENTIFICATION AND RECLAMATION OF RECYCLABLE WASTE

This invention concerns a process for fighting against environmental pollution caused by waste. The application of this process towards the recuperation of recyclable waste and the apparatus to perform this process.

Despite numerous anti-litter and environmental-protection campaigns, and despite the presence of an ever-increasing number of waste receptacles intended for public use, it must still be said that public places, especially those in proximity to take-away food premises, are becoming more and more dirty. The phenomenon does not exclude cinemas and theaters either where, after the performance, the floor is littered with rubbish (ice-cream wrappers and sticks, sweet-wrappers, tickets. etc.), nor race-courses where betting-slips find their way more easily onto the ground than into the bins.

The result spoils the environment, is a health and safety hazard in the case of food waste (chicken bones, for example). and involves considerable expense to the taxpayer for cleaning.

It would therefore be advantageous to incite that section of the public responsible for this situation, and clearly unconcerned about public welfare in general, to use waste bins by providing them with an immediate and personal incentive to do so.

This is the goal set by the invention. The goal is reached in the sense that it offers a process which consists in fitting existing waste units with: (a) the means of approximate identification of the waste intended to be or actually introduced into the said access orifice, (b) the means of conveying the said waste beyond the access orifice, and (c) the means adapted to the issue of a waste deposit slip, such as a gift-voucher, controlled by the said means of identification in combination, as the case may be, with the said means of conveying.

The aim of the means of identification is to avoid having any indiscriminate type of object being introduced into the waste unit, and provide evidence the waste has been deposited. The means will depend upon the type of waste the unit is intended for, and upon the location of the said unit. They could also depend upon other goals such as collecting waste specific in terms of origin or type. This point shall be explored below.

The waste deposit slip could, for example, represent a fraction of a free-entry voucher for the cinema or race-course, or a discount voucher for the purchase of a product of the same origin as the waste deposited, etc.

In an initial embodiment of the invention, waste identification is performed, partially at least, by comparison of a dimension of at least one part of the waste and with those of the said access orifice. This type of identification will prevent waste of a size clearly incompatible with the type intended to be introduced into the waste unit.

In the case of consumer products generating thin waste such as that generally found littering the floors of cinemas and race-courses, according to the invention, the process includes the following: added to the consumer product sold is a bag specially adapted to enclosing the said product and/or waste resulting from its use wherein the bag already bears the said waste deposit slip and the waste unit is fitted with means of separating, marking and returning the said waste deposit slip, the operations taking place on the bag while it is introduced and/or conveyed within the waste unit.

It is clear that, in the above case, a fragment of the bag will act as waste deposit slip. To prevent fraud, the bag could be untearable by hand (bag in woven or un-woven fibers or with reinforced fibers woven in). The marking carried out by the waste unit would be by stamping, perforation, or by a characteristic mark left by the means of separation and will confirm the waste deposit slip has indeed been issued by the waste unit.

In the case of larger waste such as drinks containers, metal cans, hereinafter called "cans", or paralleloliped-shaped cartons or packs with an inner layer of metal foil, hereinafter called "packs", the use of waste bags way be dispensed with and more specific identification used.

Thus, with such specific applications, identification of the waste could consist in the recognition of one of the waste material's properties, such as being magnetic or non-magnetic. It could also consist in the recognition of a standard section of the waste. Identification of the waste could be further specified by crossing the two data.

The identification could be further refined by the reading of the waste's main color and/or bar code.

However, identification could concentrate on a single feature if the aim is to recuperate a certain category of recyclable waste, such as magnetic.

In this case, according to the invention, the waste undergoes a preliminary sorting into known and accepted waste for collection in a main container and into non-recognized waste deviated into a secondary container, only the accepted waste generating the issue of a waste deposit slip.

The scope of the invention includes the apparatuses required for implementation of the process according to the invention.

Other advantages and characteristics of the invention are described in the following description and refer to the drawings appended, in which:

FIG. 1 is a parallel perspective of the upper part of the collection unit according to the invention, adapted to collect thin waste in bags, FIGS. 2a-2c are schematic views of the top of the operational part, or operational unit, of the unit in FIG. 1, showing three phases of the processing of a bag of waste and emission of a waste deposit slip, FIGS. 3a-3c are sections taken along line III—III of FIGS. 2a-2c, FIG. 4 is a plan of the top of the operational unit of a collection unit adapted for cans, FIG. 5 is a schematic view taken along line IV—IV of FIG. 4, FIG. 6 is a plan of the top of the operational unit of a collection unit adapted for packs.

FIG. 7 is a schematic cutaway view taken along line VI—VI of FIG. 6, and,

Figure 1:
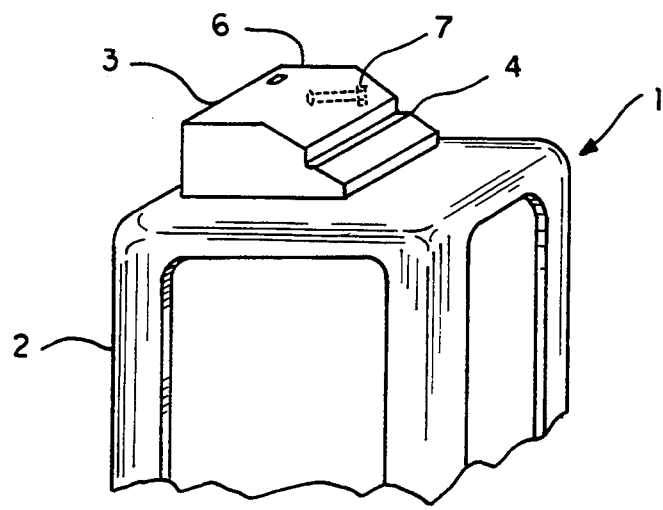

FIG. 1 shows a waste collection unit, designated as a whole as 1, made of a container 2 surmounted by an operational unit 3. The latter has a slot 4 allowing the access or introduction of a waste bag, a slot 6 for the emission of the waste deposit slip and a lateral operating handle 7. The width of the access slot 4 is too small for the fingers to be inserted.

Figure 2A:
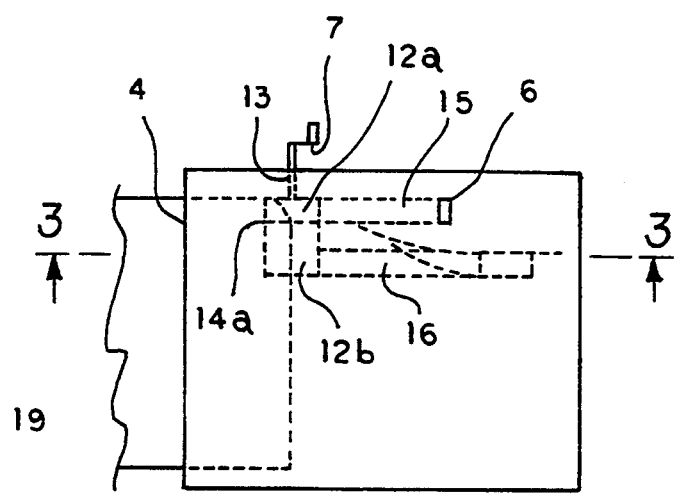
Figure 3A:
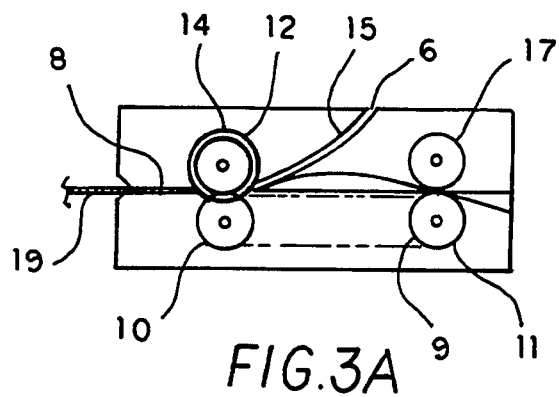

As can be seen in FIGS. 2a and 3a, the unit 3 determines a transport path 8 for the waste bag 19, part of which is an endless conveyor 9 stretched over rollers 10 and 11. Roller 10 is in contact with a drive roller 12 on the axis of rotation 13 upon which the handle 7 acts. This drive roller 12 is, in fact, in two parts, 12a and 12b, between which a circular knife 14 with a wavy blade 14a is fixed.

Beyond the rollers 10 and 12, path 8 splits into an emission path 15 extending from roller 12a and a collector path 16 extending from roller 12b. Emission path 15 leads to the outside of unit 3 via slot 6, while the collection path 16 ends up between roller 11 and a press roller 17, opposite, once the folding-back has been completed.

Figure 2B:
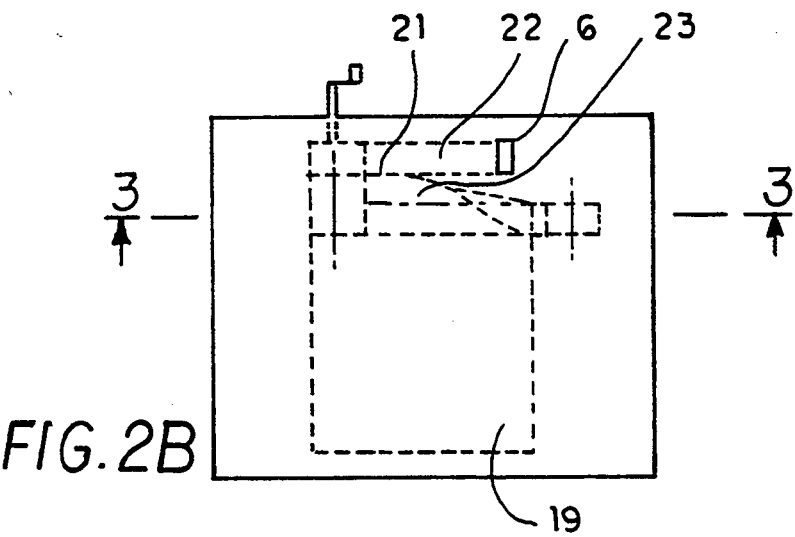
Figure 3B:
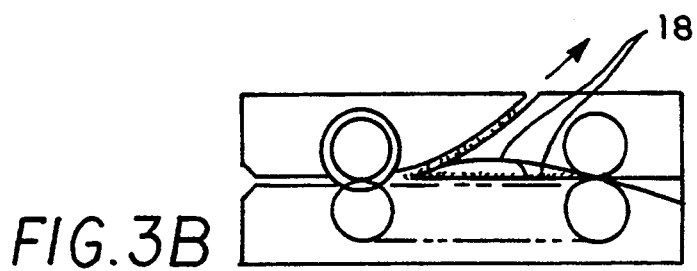
Figure 2C:
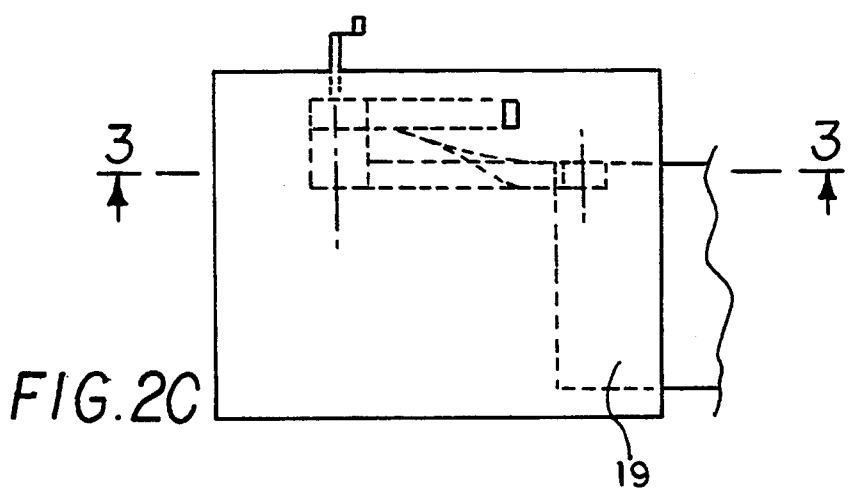
Figure 3C:
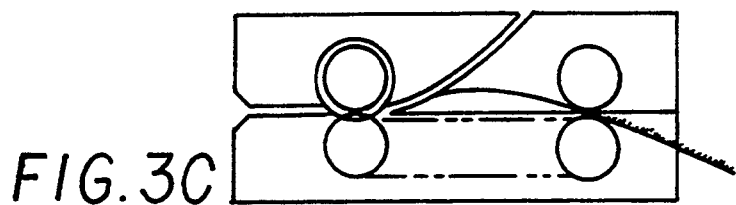
Figure 8:
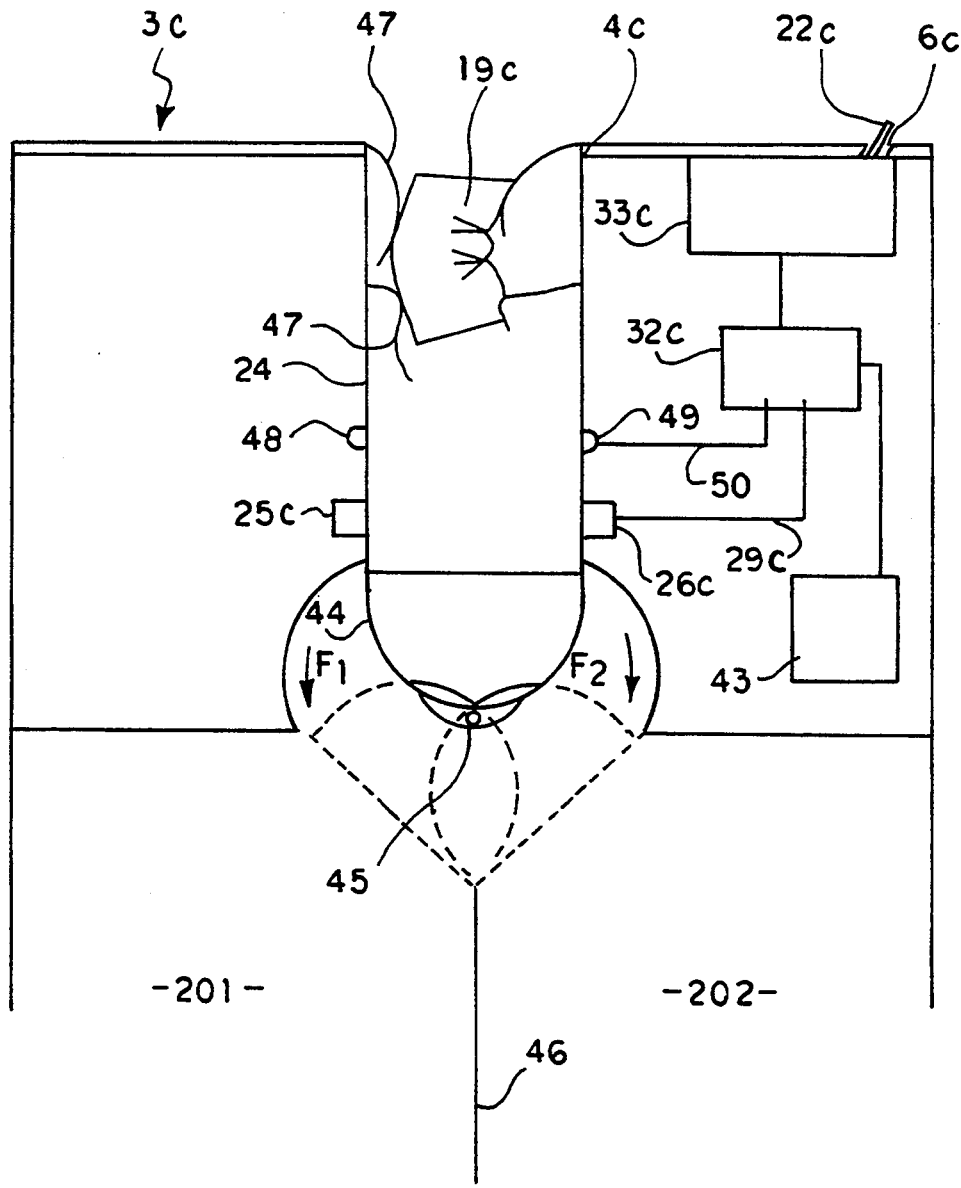
FIG. 8 is a schematic cutaway view of the operational unit of a collection and sorting unit for the recuperation of recyclable waste.

The apparatus operates as follows: a bag 19, printed with the words "Valid for . . . " (or others)in the area immediately next to its free edge, is introduced into slot 4 with its free edge facing the handle 7 up until it comes up against rollers 10 and 12 (FIGS. 2a and 3a). Operating the handle 7 causes the said roller 12 to rotate and, hence, roller 10, conveyor 9, and rollers 11 and 17 too. Rotation of rollers 10 and 12 catches the bag between them and it passes completely into slot 4 and is taken beyond the said rollers. On the way, the knife 14, fixed on the axis of rotation 13, turns simultaneously cutting the bag 19 along line 21. In doing this, the wavy edge 14a leaves a characteristic mark on the said line. The area cut out 22, forming the waste deposit slip, is deviated along the emission path 15 and emerges on the outside of unit 3 through slot 6. Area 23, forming the new free edge of the bag 19 is forced into the ramp 18 system which folds it back on itself before it reaches rollers 11 and 17 (FIGS. 2b and 3b). These rollers apply pressure to the folded-back part to ensure the fold is correctly done and close the bag 19 before it is evacuated via an appropriate drop, not shown, into container 2 (FIGS. 2c and 3c).

The simplicity and robust nature of this structure make it suitable for public places. Instead of a handle rotating once or more through 360°, by using suitable alemultiplication, a handle pivoting on an angle of less than or equal to 180° could be used. In safe places, an electrical system could be used. Similarly, the knife could have a non-wavy blade, in which case the marking would be by perforators or stamps located along the emission path 15.

The system illustrated in FIGS. 4 and 5, in which the same reference codes as in FIGS. 1–3c are used to designate the same parts and same references, except in their being followed by the letter a to designate similar parts, is suitable for collecting cans of a certain brand with a predominant color.

To achieve this, the access orifice 4a of unit 3a is circular instead of slot-shaped. Its diameter is very slightly greater than that of the product(s) 19a to be collected, which will prevent waste of a section greater than that of orifice 4a from being introduced.

Unit 3a has a downwards duct 24 leading to the container 2. A magnetic metal sensor, made up of a transmitter 25 and receiver 26, and two color sensors 27 and 28, are fitted along the downwards duct. The transmitter emits a field received by the receiver which records any disturbance of the magnetic field caused by the passage of a magnetic object. The color sensor emits a light beam and in turn receives the beam reflected by any object passing in front of it. It analyses the reflected beam and according to the absorption recorded determines whether the object is of the correct color or not.

Two color sensors, set at 90° to one another, are used to ensure the color detected is not that of a small area but indeed a predominant color.

The output 29 of the receiver 26 provides directly, or via a known interface, a logic level "1" (for example) when it detects that the waste is magnetic and a logic level "0" when it is not.

Similarly, outputs 30 and 31 of the color sensors 27 and 28 provide directly, or via a known interface, a logic level "1" (for example) when it detects that the waste is red and a logic level "0" when it is not.

Outputs 29–31 are connected to a logic control circuit 32 the output of which is connected by an interface, not shown, to a waste deposit slip 22a distributor 33.

In the preferred operating mode, the logic control circuit 32 is a read-only memory of which the addressing inputs e1–e3 are connected to outputs 29–31. This memory can be programmed as follows:

If the input signal is 111, the memory 32 instructs distributor 33 to issue a waste deposit slip 22a through slot 6a, For all other input signals:

011: non-magnetic material with red as predominant color, 001 or 010: non-magnetic material with a limited area of red.

110 or 101: magnetic material with a limited area of

000: material neither magnetic nor red.

the memory sends no emission order to the distributor.

The apparatus could have more color sensors if increased sensing precision is required and that the above-mentioned sensors, whether it concern waste characteristics such as magnetic, nonmagnetic or predominant color, are but examples among many others possible. Similarly, the property detected could be other than magnetic.

The system illustrated in FIGS. 6 and 7, in which the same reference codes as in FIGS. 1–5 are used to designate the same parts and same references, except in their being followed by the letter b to designate similar parts, is suitable for collecting packs of the same cross section but which could exist in two different heights, e.g. one-liter or half-liter packs the deposit of which generates two different waste deposit slips according to the model involved.

To do this, the access orifice 4b of unit 3b is rectangular and its section very slightly greater than the standard section of packs to be collected for the same reasons as those mentioned above.

Unit 3b has a downwards duct 24 leading to the container 2. Three pairs of sensors. 34, 35 and 36, are fitted along the downwards duct. Sensor pair 35 is set at 90° to sensor pair 34 to ensure the waste indeed has a section corresponding to the standard section. The distance between sensor pairs 34 and 36 is such that only a large-sized pack 19b may touch them both simultaneously.

Outputs 37 and 38 of sensor pair 34, outputs 39 and 40 of sensor pair 35, and 41 and 42 of sensor pair 36 provide directly, or via a known interface, a logic level "1" (for example) when they are touched by waste 19b during its drop in the duct 24 and a logic level "0" when they are not.

Outputs 37–42 are connected to a logic control circuit 32b the output of which is connected by an interface, not shown, to a waste deposit slip 22b or 22b' distributor 33b.

In the preferred operating mode, the logic control circuit 32b is a read-only memory of which the addressing inputs are connected to outputs 37–42. This memory can be programmed as follows:

In the input signal is 111111, the memory 32b instructs distributor 33b to issue a large-sized pack waste deposit slip 22b through slot 4b, If the input signal is 111100, the memory 32b instructs distributor 33b to issue a small-sized pack waste deposit slip through slot 4b' (a small-sized pack such as this corresponds to the upper part of pack 19b the bottom of which is delimited by the dashed line 49 in FIG. 7), If the input signal is 001111, which occurs upon simultaneous contact of sensor pairs 35 and 36 by a large-sized pack once it has passed sensor pair 34, or even by a small-sized pack if sensor pairs 35 and 36 are close enough together, the memory 32b sends no instructions to the distributor.

For all other input signals such as:

110000 or 001111: waste with one dimension corresponding to the width or length of the standard dimension expected, but not to both, 100100, 011001, etc.: waste of irregular shape, waste of small sectional size bumping into one wall then another of the duct, etc.

the memory 32b sends no emission order to the waste deposit slip distributor either.

The system could obviously also include a sensor of the type of material making up the waste such as the set 25a and 25b the output signal of which would be combined with the above-mentioned signals. It would only issue a waste deposit slip for given sizes of packs, in which case sensor pair 35 and slot 4b' would be eliminated. The distributor 33b could also issue waste deposit slips for small or large sizes through one and the same slot.

Instead of being adapted to accept packs of standard rectangular section but different capacity and, hence, height, the unit, according to the invention, could be designed to accept, for example, packs of the same capacity but different rectangular sections, with at least one dimension being common to the different packs of so-called "small" and "large" sections. In this case, two of the sides facing one another, the "standard distance sides", in the opening 4b would, with a certain amount of play be at a distance corresponding to this common dimension, the length of the opening's opposite sides being chosen such that both small- and large-section packs may be introduced. In this case as well, the sensors would need only to be placed along the walls of duct 24 prolonging the standard distance sides if distinguishing between small- and large-section packs for identification purposes is not required.

The system illustrated in FIG. 7 applies the principle of incentive, according to the invention, to the deposit of a certain type of recyclable waste.

As before, the same references as in FIGS. 1–5 are used to designate the same parts and same references, except in their being followed by the letter c to designate similar parts.

Here, the shape and size of the access orifice 4c of the unit 3c are not related to a product shape since the aim is to collect products having a common component element, e.g. empty tins of food of whatever shape or condition, such as the dented can 19c. The access orifice 4c will therefore be relatively large. As in the case for the system illustrated in FIGS. 4 and 5, the downwards duct 24 is connected to a transmitter 25c and receiver 26c the output 29c of which is connected to a read-only memory 32c, itself connected by an interface, not shown, to a waste deposit slip 22c distributor 33c and a motor 43. Duct 24 is also fitted with a passage detector, made up, for example, of photoelectric cells 48 and 49, the output 50 of receiver 49 also being connected to the read-only memory 32c. As can be seen, perpendicularly beneath the downwards duct 24 is a trough 44 fixed to an axis of rotation 45 controlled by the motor 43. Beneath the axis of rotation 45 there is a partition 46 separating a primary container 201 from a secondary container 202. To prevent fraud, transmitter 25c and receiver 26c are at a suitable distance from the orifice 4c which is fitted with a one-way device 47.

When the read-only memory receives the input signal 11 passage of a magnetic material), it instructs both the distributor 33c to issue a waste deposit slip 22c through slot 6c and the motor 43 to rotate in such a way as to turn the axis 45 in the direction of the arrow F1: the trough empties the waste 19c it has received into the container 201. When the read-only memory receives the input signal (passage of a non-magnetic material), it sends no instruction to the distributor 33c, but instructs the motor 43 to rotate the axis 45 in the direction of the arrow F2: the trough empties the waste 19c into container 202.

I claim:

1. Collection unit for collecting and identifying waste for recycling, said collection unit comprising:
   a bag adapted to enclose the waste, wherein said bag includes a waste deposit slip;
   an access orifice for accepting the waste enclosed in said bag;
   means for the identification of the waste introduced to said access orifice;
   means of conveying the waste away from said access orifice; and,
   means for issuing said waste deposit slip, following positive identification, by said means of identification.

2. Collection unit as claimed in claim 1, wherein said collection unit further comprises means for separating, means for marking, and means for returning said waste deposit slip.

3. Collection unit as claimed in claim 2, wherein said means of marking said waste deposit slip places a characteristic mark identifying the waste deposited.

4. Collection unit as claimed in claim 2, wherein said means of separation includes said means of marking.

5. Collection unit as claimed in claim 2, wherein said means of marking includes a circular knife.

6. Collection unit as claimed in claim 3, wherein said means for collecting further includes means for sorting waste into recognized waste for collection in a primary container, and unidentified waste is sorted as non-recognized waste for collection in a second container;
   wherein said waste deposit slip denotes only the recognized waste.

7. Collection unit as claimed in claim 1, wherein said waste deposit slip is a gift voucher.

8. Collection unit as claimed in claim 1, further including means for separating, marking and returning said waste deposit slip.

9. Collection unit as claimed in claim 1, wherein said means for identification further includes a detector for distinguishing between magnetic and nonmagnetic materials.

10. Collection unit as claimed in claim 1, wherein said means for identification further includes sensors for recognizing a standard section.

11. Collection unit as claimed in claim 1, wherein said means for identification further includes at least one color sensor.

12. Collection unit as claimed in claim 1, wherein said means for identification further includes at least one bar-code sensor.

13. Collection units as claimed in claim 1, wherein said means for identification further includes,
  a primary container and a secondary container for non-recognized waste;
  means for sorting between these containers; and
  means of providing instructions connected to said means of identification, said means for issuing said waste deposit slip and said means of sorting;
  wherein said means of identification handles the trash before the means of sorting, and wherein said means of providing instructions controls the issuance of a waste deposit slip and the sorting of the waste to said primary container and said secondary container.

14. Collection unit as claimed in claim 1, wherein said means for identification further includes means for detecting the conductivity of the waste.

* * * * *